US011978964B2

(12) United States Patent
Wang et al.

(10) Patent No.: US 11,978,964 B2
(45) Date of Patent: May 7, 2024

(54) ANTENNA STRUCTURE, CIRCUIT BOARD WITH ANTENNA STRUCTURE, AND COMMUNICATIONS DEVICE

(71) Applicant: Huawei Technologies Co., Ltd., Shenzhen (CN)

(72) Inventors: Yongchao Wang, Xi'an (CN); Xin Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 17/756,433

(22) PCT Filed: Nov. 2, 2020

(86) PCT No.: PCT/CN2020/125950
§ 371 (c)(1),
(2) Date: May 25, 2022

(87) PCT Pub. No.: WO2021/103949
PCT Pub. Date: Jun. 3, 2021

(65) Prior Publication Data

US 2023/0006365 A1 Jan. 5, 2023

(30) Foreign Application Priority Data

Nov. 26, 2019 (CN) ......................... 201911186224.5

(51) Int. Cl.
*H01Q 1/38* (2006.01)
*H01Q 1/24* (2006.01)
(Continued)

(52) U.S. Cl.
CPC ............... *H01Q 21/24* (2013.01); *H01Q 1/24* (2013.01); *H01Q 1/48* (2013.01); *H01Q 1/52* (2013.01); *H01Q 9/045* (2013.01)

(58) Field of Classification Search
CPC ............ H01Q 1/24; H01Q 1/243; H01Q 1/48; H01Q 1/52; H01Q 21/06; H01Q 21/065;
(Continued)

(56) References Cited

U.S. PATENT DOCUMENTS 5,005,019 A 4/1991 Zaghloul et al.
5,708,444 A * 1/1998 Pouwels .............. H01Q 21/065 343/846
(Continued)

FOREIGN PATENT DOCUMENTS

CN 101777700 A 7/2010
CN 102014180 A 4/2011
(Continued)

OTHER PUBLICATIONS

Zhang et al, "Double Torsion Coil :Feeding Structure for Patch Antennas," IEEE Transactions on Antennas and Propagation, vol. 67, No. 6, Jun. 2019, pp. 3688-3694.
(Continued)

*Primary Examiner* — Tho G Phan
(74) *Attorney, Agent, or Firm* — Slater Matsil, LLP

(57) ABSTRACT

An antenna structure, a circuit board with an antenna structure, and a communications device. The antenna structure includes a signal reference ground, a first radiation patch, a second radiation patch, and at least one feed probe. The feed probe is located between the first radiation patch and the ground. Each feed probe includes a first end and a second end. A projection position of the first end on a plane of the signal reference ground is outside a projection area of the first radiation patch on the plane of the signal reference ground is located, and a projection position of the second end on the plane of the signal reference ground is inside the projection area of the first radiation patch on the plane of the
(Continued)

signal reference ground. The second end is electrically connected to the signal reference ground.

20 Claims, 8 Drawing Sheets

(51) Int. Cl.

| | |
|---|---|
| ***H01Q 1/48*** | (2006.01) |
| ***H01Q 1/52*** | (2006.01) |
| ***H01Q 9/04*** | (2006.01) |
| ***H01Q 21/24*** | (2006.01) |

(58) Field of Classification Search

CPC ........ H01Q 9/04; H01Q 9/0414; H01Q 9/045; H01Q 9/0457; H01Q 1/22; H01Q 1/38; H01Q 1/50

See application file for complete search history.

(56) References Cited

U.S. PATENT DOCUMENTS

| | | | | |
|---|---|---|---|---|
| 6,359,588 | B1 * | 3/2002 | Kuntzsch ............. | H01Q 9/0407 343/846 |
| 6,593,887 | B2 * | 7/2003 | Luk ...................... | H01Q 9/0457 343/846 |
| 7,427,957 | B2 * | 9/2008 | Zeinolabedin Rafi ....................... | H01Q 19/005 343/770 |
| 9,325,071 | B2 * | 4/2016 | Fasenfest ............... | H01Q 9/045 |
| 9,871,297 | B2 * | 1/2018 | Kitchener .............. | H01Q 9/045 |
| 10,854,994 | B2 * | 12/2020 | Niroo Jazi ........... | H01Q 1/2283 |
| 11,183,766 | B2 * | 11/2021 | Jia ........................ | H01Q 9/0457 |
| 2004/0145525 | A1 | 7/2004 | Annabi et al. | |
| 2006/0256015 | A1 | 11/2006 | Park et al. | |
| 2007/0279143 | A1 | 12/2007 | Itsuji | |
| 2012/0119954 | A1 | 5/2012 | Chen | |
| 2012/0229366 | A1 | 9/2012 | Ding | |
| 2017/0040665 | A1 | 2/2017 | Takashima et al. | |
| 2017/0125919 | A1 | 5/2017 | Chien et al. | |
| 2017/0170567 | A1 | 6/2017 | Luo et al. | |
| 2018/0301814 | A1 | 10/2018 | Zhang et al. | |

FOREIGN PATENT DOCUMENTS

| | | | |
|---|---|---|---|
| CN | 102570015 | A | 7/2012 |
| CN | 104425872 | A | 3/2015 |
| CN | 104836031 | A | 8/2015 |
| CN | 104852150 | A | 8/2015 |
| CN | 105990670 | A | 10/2016 |
| CN | 206116612 | U | 4/2017 |
| CN | 104183916 | B | 7/2017 |
| CN | 104485522 | B | 1/2018 |
| CN | 108232458 | A | 6/2018 |
| CN | 207651660 | U | 7/2018 |
| CN | 207800903 | U | 8/2018 |
| CN | 108539410 | A | 9/2018 |
| CN | 108879094 | A | 11/2018 |
| CN | 109301460 | A | 2/2019 |
| CN | 208460963 | U | 2/2019 |
| CN | 208862174 | U | 5/2019 |
| CN | 109888487 | A | 6/2019 |
| CN | 209217196 | U | 8/2019 |
| JP | 2006129431 | A | 5/2006 |
| WO | 2006094644 | A1 | 9/2006 |
| WO | 2019025593 | A1 | 2/2019 |

OTHER PUBLICATIONS

Yusuf, Y. et al., "A Low-Cost Patch Antenna Phased Array With Analog Beam Steering Using Mutual Coupling and Reactive Loading", IEEE Antennas and Wireless Propagation Letters, vol. 7, Apr. 4, 2008, pp. 81-84.

Liu, X. et al., "Study of Probe Feeder Patch Antenna Using Dagonal Anti-phase Technique", Shipboard Electronic Countermeasure, vol. 29, No. 6, Dec. 2006, 4 pages.

Xu, G. et al., "Radiation Characteristics of Wideband High Power Patch Antenna Array", High Power Laser and Particle Beams, vol. 22, No. 12, Dec. 2010 11 pages (including translation).

* cited by examiner

ANTENNA STRUCTURE, CIRCUIT BOARD WITH ANTENNA STRUCTURE, AND COMMUNICATIONS DEVICE

CROSS-REFERENCE TO RELATED APPLICATIONS

This application is a National Stage of International Patent Application No. PCT/CN2020/125950, filed on Nov. 2, 2020, which claims priority to Chinese Patent Application No. 201911186224.5, filed on Nov. 26, 2019, both of which are hereby incorporated by reference in their entireties.

TECHNICAL FIELD

This application relates to the field of communications device technologies, and in particular, to an antenna structure, a circuit board with an antenna structure, and a communications device.

BACKGROUND

For convenience of carrying or cost saving, a size of a communications device (especially a terminal) such as a mobile phone, a tablet computer, or a base station is designed to be smaller with smaller internal space for installing an antenna. It has become a trend to design the antenna structure to be a low-profile structure and package the antenna structure in a circuit board. However, because a thickness of the circuit board is relatively small, when the antenna structure is packaged in the circuit board with the relatively small thickness, a thickness of the antenna structure needs to be made quite small. It is common sense that a smaller thickness (that is, a smaller profile) of the antenna structure indicates a narrower bandwidth. Therefore, how to expand a bandwidth of the antenna structure with a low profile becomes an urgent problem to be resolved.

For example, FIG. 1 is a low-profile antenna structure in a conventional technology. As shown in FIG. 1, the antenna structure includes a signal reference ground 01, a radiation patch 02, and a feed probe 03. The radiation patch 02 and the signal reference ground 01 are stacked and spaced apart. An air cavity 04 is formed between the radiation patch 02 and the signal reference ground 01. One end of the feed probe 03 is a signal input end, and the other end extends into the air cavity 04. A part of the feed probe 03 that extends into the air cavity 04 can feed the radiation patch 02 in a coupled feeding manner. The air cavity 04 is filled with air, and the air has a dielectric constant approaching 1, which is smaller than that of other filling mediums. Therefore, the bandwidth can be expanded to a certain extent. However, it is rather difficult to arrange the air cavity in the circuit board. Further, it is tested by experiments that under a condition that a relative bandwidth is greater than 20% in the antenna structure, the thickness of the antenna structure shown in FIG. 1 is 0.11 times a wavelength. Because the thickness of the circuit board generally does not exceed 0.07 times the wavelength, the antenna structure cannot be packaged in a circuit board.

SUMMARY

Embodiments of this application provide an antenna structure, a circuit board with an antenna structure, and a communications device, to lower a profile of the antenna structure while meeting a bandwidth of the antenna structure, so that the antenna structure can be packaged in a circuit board in the communications device.

To achieve the foregoing objective, the following technical solutions are used in embodiments of this application.

According to a first aspect, some embodiments of this application provide an antenna structure. The antenna structure includes a signal reference ground, a first radiation patch, a second radiation patch, and at least one feed probe. The first radiation patch and the signal reference ground are stacked and spaced apart. The second radiation patch is located on a side that is of the first radiation patch and that is away from the signal reference ground, and the second radiation patch and the first radiation patch are stacked and spaced apart. The at least one feed probe is located between the first radiation patch and the signal reference ground. Each feed probe includes a first end and a second end that are opposite to each other. The first end is a signal input end, and a projection position of the first end on a plane on which the signal reference ground is located is outside a projection area of the first radiation patch on the plane on which the signal reference ground is located. A projection position of the second end on the plane on which the signal reference ground is located is inside the projection area of the first radiation patch on the plane on which the signal reference ground is located, and the second end is electrically connected to the signal reference ground. A part that is of each feed probe and that is face-to-face with the first radiation patch is capable of feeding the first radiation patch and the second radiation patch in a coupled feeding manner.

The antenna structure provided in embodiments of this application includes the signal reference ground, the first radiation patch, the second radiation patch, and the at least one feed probe. The first radiation patch and the signal reference ground are stacked and spaced apart. The second radiation patch is located on the side that is of the first radiation patch and that is away from the signal reference ground, and the second radiation patch and the first radiation patch are stacked and spaced apart. The at least one feed probe is located between the first radiation patch and the signal reference ground. Each feed probe includes the first end and the second end that are opposite to each other. The projection position of the first end on the plane on which the signal reference ground is located is outside the projection area of the first radiation patch on the plane on which the signal reference ground is located. The projection position of the second end on the plane on which the signal reference ground is located is inside the projection area of the first radiation patch on the plane on which the signal reference ground is located. The part that is of each feed probe and that is face-to-face with the first radiation patch is capable of feeding the first radiation patch and the second radiation patch in a coupled feeding manner. Therefore, when one feed probe performs feeding, the two radiation patches (namely, the first radiation patch and the second radiation patch) are passed, generating two resonances. Further, because the second end of the feed probe is electrically connected to the signal reference ground, impedance matching performance between the two resonances can be improved, thereby increasing an impedance bandwidth. In other words, a profile of the antenna structure can be lowered while a same relative bandwidth is met, so that the antenna structure can be packaged in a circuit board in the communications device.

Optionally, a length of the part that is of each feed probe and that is face-to-face with the first radiation patch is 0.4 to 0.6 times a wavelength. When the length of the part that is of the feed probe and that is face-to-face with the first radiation patch falls within this range, the antenna structure has a relatively large bandwidth and a relatively low profile.

Optionally, the projection area of the first radiation patch on the plane on which the signal reference ground is located is a first projection area; a projection area of the second radiation patch on the plane on which the signal reference ground is located is a second projection area; and a center of the first projection area coincides with a center of the second projection area. As a result, a distance between an edge of the first projection area and an edge of the second projection area is relatively short, and a length of a part that is of the feed probe and that is used to feed the first radiation patch is approximately equal to a length of a part that is of the feed probe and that is used to feed the second radiation patch.

Optionally, the at least one feed probe includes two feed probes. A projection area, on the plane on which the signal reference ground is located, of a part that is of one of the two feed probes and that is face-to-face with the first radiation patch is a third projection area. The third projection area is perpendicular to a first axis that passes through the center of the first projection area and that is on the plane on which the signal reference ground is located, and the third projection area is axially symmetrical with respect to the first axis. A projection area, on the plane on which the signal reference ground is located, of a part that is of the other one of the two feed probes and that is face-to-face with the first radiation patch is a fourth projection area. The fourth projection area is perpendicular to a second axis that passes through the center of the first projection area and that is on the plane on which the signal reference ground is located, and the fourth projection area is axially symmetrical with respect to the second axis. The first axis is perpendicular to the second axis. In this way, dual polarization of the antenna structure may be implemented by using the two feed probes, so that the antenna structure can simultaneously transmit or receive two signals, thereby increasing transmitting and receiving capacities of the antenna structure, ensuring relatively high isolation between two polarization directions, and avoiding cross interference.

Optionally, both the first radiation patch and the second radiation patch are in the shape of a square. In this way, when the antenna structures form an array, cross interference between two adjacent antenna structures is relatively weak.

According to a second aspect, some embodiments of this application provide a circuit board with an antenna structure, where the circuit board with an antenna structure includes a circuit board and at least one antenna structure disposed on the circuit board, and the antenna structure is the antenna structure according to any one of the foregoing technical solutions.

The antenna structure in the circuit board with an antenna structure provided in embodiments of this application is the same as an antenna structure provided in the embodiment of the antenna structure according to any one of the foregoing technical solutions. Therefore, the two antenna structures can resolve a same technical problem and achieve a same expected effect.

Optionally, the antenna structure is fabricated on a surface of the circuit board.

Optionally, the circuit board includes a first dielectric layer, a second dielectric layer, and a third dielectric layer that are sequentially stacked. A signal reference ground is a metal layer disposed on a surface that is of the first dielectric layer and that is away from the second dielectric layer. At least one feed probe is a metal layer disposed on a surface that is of the first dielectric layer and that faces the second dielectric layer, or the at least one feed probe is a metal layer disposed on a surface that is of the second dielectric layer and that faces the first dielectric layer. A first radiation patch is a metal layer disposed on a surface that is of the second dielectric layer and that is away from the first dielectric layer. A second radiation patch is a metal layer disposed on a surface that is of the third dielectric layer and that is away from the second dielectric layer. In this way, the antenna structure is packaged in the circuit board by using the existing dielectric layers in the circuit board, and the antenna structure does not need to occupy an external space of the circuit board. This facilitates a miniaturized design for a communications device. In addition, because surface precision of the dielectric layer is relatively high, using the dielectric layer as a bearing medium helps improve size precision of each structure in the antenna structure.

Optionally, the first dielectric layer, the second dielectric layer, and the third dielectric layer are press-fitted by using a thermo compression process.

Optionally, the at least one feed probe is a metal layer disposed on a surface that is of the first dielectric layer and that faces the second dielectric layer, a metallized via hole is provided at a location of the first dielectric plate layer corresponding to a second end of each feed probe, the metallized via hole penetrates the first dielectric layer, and the second end of the feed probe is electrically connected to the signal reference ground through the metallized via hole. Providing the metallized via hole on the dielectric layer has relatively high precision, low costs, and is easy to implement.

Optionally, the at least one antenna structure includes a plurality of antenna structures, and an array of the plurality of antenna structures is disposed on the circuit board. In this way, a relatively large antenna gain can be obtained by using the array of the antenna structures.

According to a third aspect, some embodiments of this application provide a communications device. The communications device includes a housing and a circuit board disposed in the housing. The circuit board is the circuit board with an antenna structure according to any one of the foregoing technical solutions.

The circuit board in the communications device provided in this embodiment of this application is the same as a circuit board with an antenna structure provided in the embodiment of the circuit board with an antenna structure according to any one of the foregoing technical solutions. Therefore, the two circuit boards can resolve a same technical problem and achieve a same expected effect.

Optionally, the communications device is a terminal.

REFERENCE NUMERALS

01: signal reference ground; 02: radiation patch; 03: feed probe; 04: air cavity; 1: housing; 2: circuit board with an antenna structure; 21: circuit board; 211: first dielectric layer; 212: second dielectric layer; 213: third dielectric layer; 22: antenna structure; 221: signal reference ground; 222: first radiation patch; 223: second radiation patch; 224: feed probe; 2241: first end of the feed probe; 2242: second end of the feed probe; 225: metallized via hole.

DETAILED DESCRIPTION OF ILLUSTRATIVE EMBODIMENTS

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

For convenience of carrying or cost saving, a size of a communications device such as a mobile phone, a tablet computer, or a base station, especially a terminal such as a mobile phone or a tablet computer is designed to be smaller with smaller internal space for installing an antenna. It has become a trend to design the antenna structure to be a low-profile structure and package the antenna structure in a circuit board. However, because a thickness of the circuit board is relatively small, when the antenna structure is packaged in the circuit board with a relatively small thickness, a profile of the antenna structure needs to be made quite small. However, a smaller profile of the antenna structure indicates a narrower bandwidth. Therefore, how to expand a bandwidth of the antenna structure with a low profile while lowering the profile of the antenna structure becomes an urgent problem to be resolved.

Figure 1:
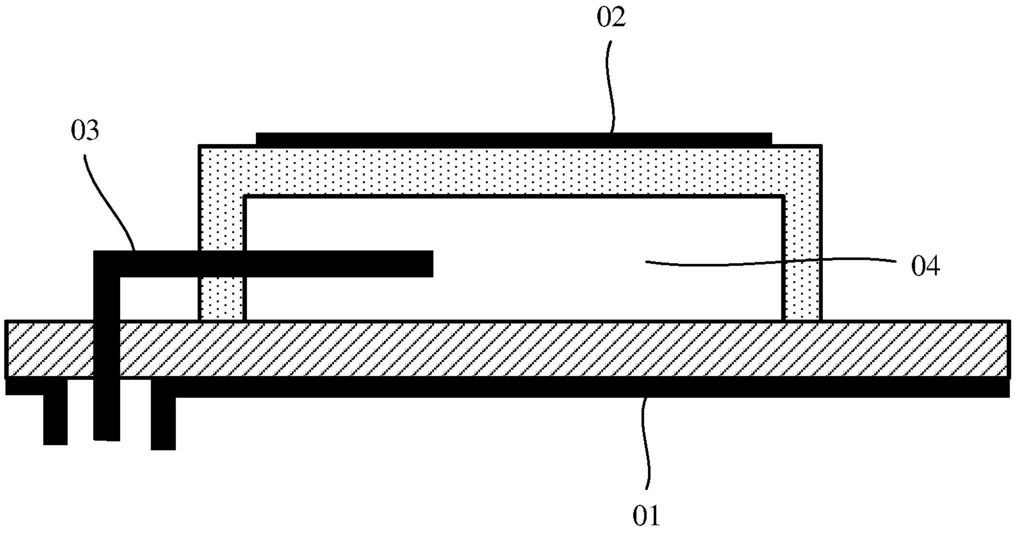
FIG. 1(PRIOR ART)
FIG. 1 is a schematic diagram of an antenna structure according to a conventional technology.
Figure 2:
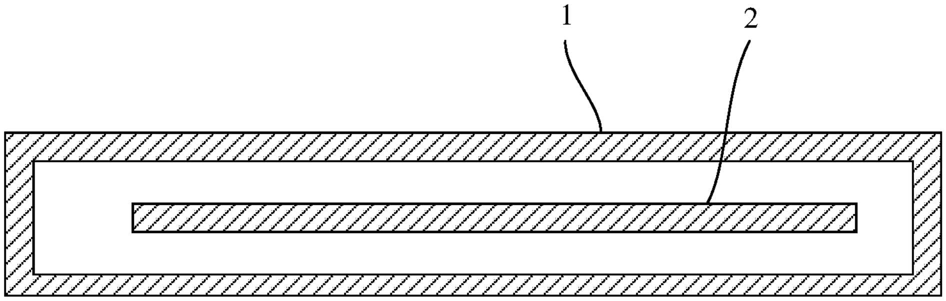
FIG. 2 is a schematic diagram of a structure of a communications device according to an embodiment of this application.

To resolve the foregoing problem, FIG. 2 is provided, which is a schematic diagram of a structure of a communications device according to some embodiments of this application. As shown in FIG. 2, the communications device includes a housing 1 and a circuit board 2 disposed in the housing 1, and the circuit board 2 is a circuit board with an antenna structure. The communications device includes but is not limited to a terminal or a base station. In some embodiments, the communications device is a terminal such as a mobile phone or a tablet computer.

Figure 3:
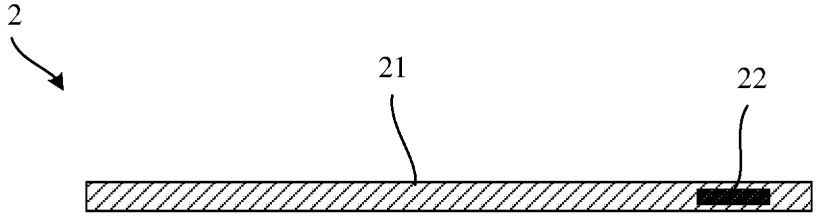
FIG. 3 is a schematic diagram of a structure of a first type of a circuit board with an antenna structure according to an embodiment of this application.

FIG. 3 is a schematic diagram of a structure of a circuit board 2 with an antenna structure according to some embodiments of this application. As shown in FIG. 3, the circuit board 2 with an antenna structure includes a circuit board 21 and at least one antenna structure 22 disposed on the circuit board 21.

Figure 4:
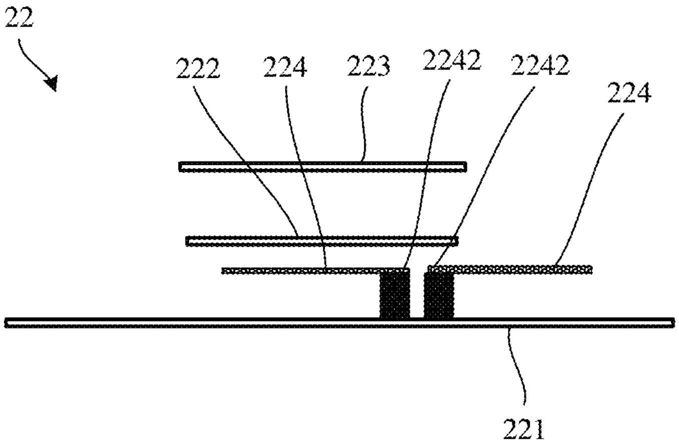
FIG. 4 is a schematic diagram of a structure of an antenna structure according to an embodiment of this application.
Figure 5:
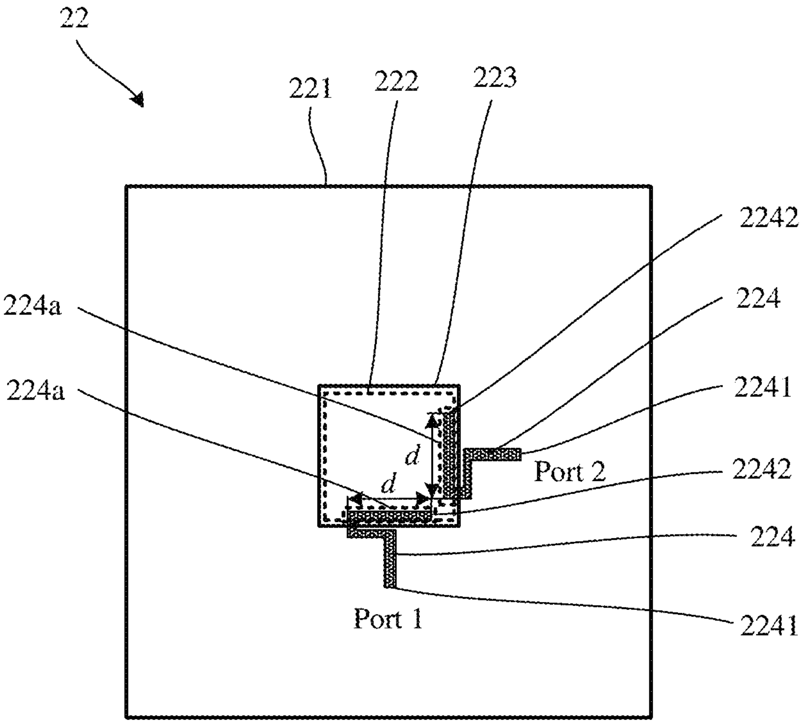
FIG. 5 is a top view of the antenna structure shown in FIG. 4.
Figure 6:
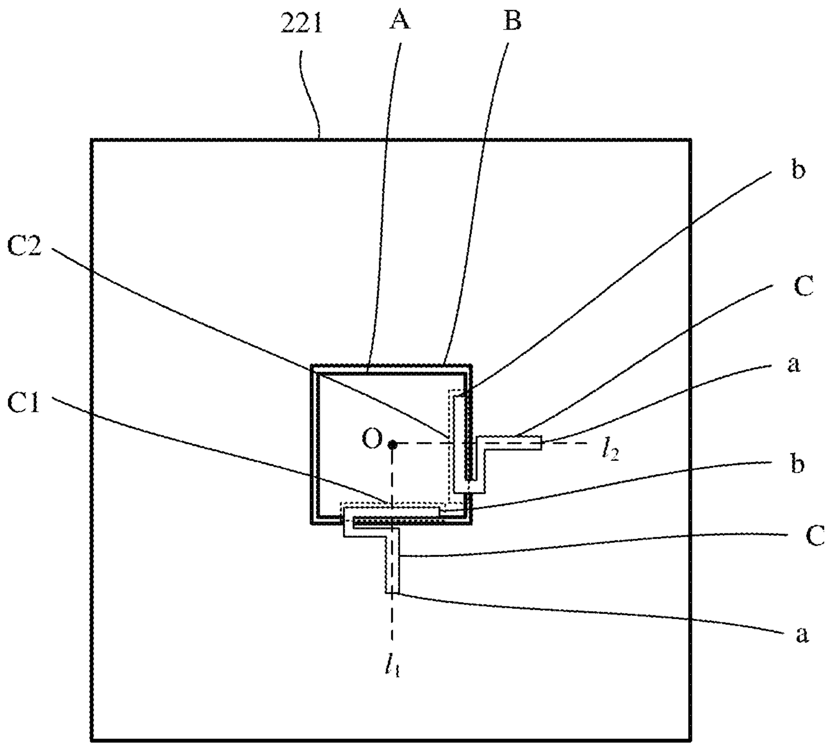
FIG. 6 is a schematic diagram of projection of a first radiation patch, a second radiation patch, and two feed probes in the antenna structure shown in FIG. 4 on a plane on which a signal reference ground is located.

FIG. 4 and FIG. 5 are schematic diagrams of a structure of an antenna structure 22 according to some embodiments of this application. As shown in FIG. 4 and FIG. 5, the antenna structure 22 includes a signal reference ground 221, a first radiation patch 222, a second radiation patch 223, and at least one feed probe 224. The first radiation patch 222 and the signal reference ground 221 are stacked and spaced apart. The second radiation patch 223 is located on a side that is of the first radiation patch 222 and that is away from the signal reference ground 221, and the second radiation patch 223 and the first radiation patch 222 are stacked and spaced apart. The at least one feed probe 224 is located between the first radiation patch 222 and the signal reference ground 221. As shown in FIG. 5, each feed probe 224 includes a first end 2241 and a second end 2242 that are opposite to each other. The first end 2241 is a signal input end. As shown in FIG. 6, a projection position a of the first end 2241 on a plane on which the signal reference ground 221 is located is outside a projection area A of the first radiation patch 222 on the plane on which the signal reference ground 221 is located. A projection position b of the second end 2242 on the plane on which the signal reference ground 221 is located is inside the projection area A of the first radiation patch 222 on the plane on which the signal reference ground 221 is located. As shown in FIG. 4, the second end 2242 is electrically connected to the signal reference ground 221. A part 224*a* that is of each feed probe 224 and that is face-to-face with the first radiation patch 222 is capable of feeding the first radiation patch 222 and the second radiation patch 223 in a coupled feeding manner.

It should be noted that the part 224*a* that is of the feed probe 224 and that is face-to-face with the first radiation patch 222 is a part that is of a projection area of the feed probe 224 on the plane on which the signal reference ground 221 is located and that is within the projection area A of the first radiation patch 222 on the plane on which the signal reference ground 221 is located.

The antenna structure 22 provided in embodiments of this application, as shown in FIG. 4 and FIG. 5, includes the signal reference ground 221, the first radiation patch 222, the second radiation patch 223, and the at least one feed probe 224. The first radiation patch 222 and the signal reference ground 221 are stacked and spaced apart. The second radiation patch 223 is located on the side that is of the first radiation patch 222 and that is away from the signal reference ground 221, and the second radiation patch 223 and the first radiation patch 222 are stacked and spaced apart. The at least one feed probe 224 is located between the first radiation patch 222 and the signal reference ground 221. As shown in FIG. 5, each feed probe 224 includes the first end 2241 and the second end 2242 that are opposite to each other. The first end 2241 is a signal input end. As shown in FIG. 6, the projection position a of the first end 2241 on the plane on which the signal reference ground 221 is located is outside the projection area A of the first radiation patch 222 on the plane on which the signal reference ground 221 is located. The projection position b of the second end 2242 on the plane on which the signal reference ground 221 is located is inside the projection area A of the first radiation patch 222 on the plane on which the signal reference ground 221 is located. As shown in FIG. 4, a part that is of each feed probe 224 and that is face-to-face with the first radiation patch 222 is capable of feeding the first radiation patch 222 and the second radiation patch 223 in a coupled feeding manner. When one feed probe 224 performs feeding, the two radiation patches (namely, the first radiation patch 222 and the second radiation patch 223) are passed, generating two resonances. Further, because the second end 2242 of the feed probe is electrically connected to the signal reference ground 221 (as shown in FIG. 4), impedance matching performance between the two resonances can be improved, thereby increasing an impedance bandwidth. In other words, a profile of the antenna structure 22 can be lowered while a same relative bandwidth is met, so that the antenna structure 22 can be packaged in a circuit board in a communications device.

The antenna structure 22 in the circuit board 2 with an antenna structure provided in this embodiment of this application is the same as an antenna structure provided in the embodiment of the antenna structure 22. Therefore, the two antenna structures can resolve a same technical problem and achieve a same expected effect.

The circuit board 2 in the communications device provided in this embodiment of this application is the same as a circuit board with an antenna structure provided in the embodiment of the circuit board 2 with an antenna structure. Therefore, the two circuit boards can resolve a same technical problem and achieve a same expected effect.

The antenna structure 22 may be fabricated on a surface of the circuit board 21, or may be packaged in the circuit board 21. This is not specifically limited herein.

Figure 7:
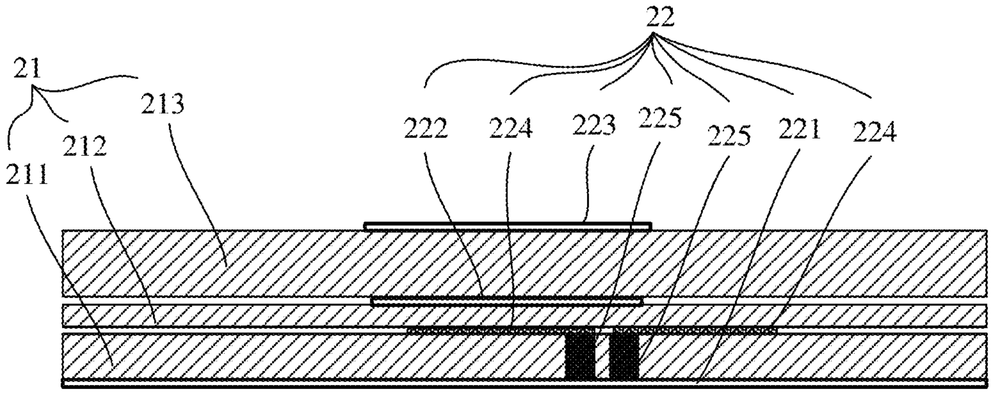
FIG. 7 is a schematic diagram of a structure of a second type of a circuit board with an antenna structure according to an embodiment of this application.

In some embodiments, FIG. 7 is a schematic diagram of a structure of a circuit board with an antenna structure according to some other embodiments of this application. As shown in FIG. 7, the circuit board 21 includes a first dielectric layer 211, a second dielectric layer 212, and a third dielectric layer 213 that are sequentially stacked. A signal reference ground 221 is a metal layer disposed on a surface that is of the first dielectric layer 211 and that is away from the second dielectric layer 212. At least one feed probe 224 is a metal layer disposed on a surface that is of the first dielectric layer 211 and that faces the second dielectric layer 213, or the at least one feed probe 224 is a metal layer disposed on a surface that is of the second dielectric layer 212 and that faces the first dielectric layer 211. A first radiation patch 222 is a metal layer disposed on a surface that is of the second dielectric layer 212 and that is away from the first dielectric layer 211. A second radiation patch 223 is a metal layer disposed on a surface that is of the third dielectric layer 213 and that is away from the second dielectric layer 212. In this way, the antenna structure 22 is packaged in the circuit board 21 by using the existing dielectric layers in the circuit board 21, and the antenna structure 22 does not need to occupy an external space of the circuit board 21. This facilitates a miniaturized design for a communications device. In addition, because surface precision of the dielectric layer is relatively high, using the dielectric layer as a bearing medium helps improve size precision of each structure in the antenna structure 22.

In the foregoing embodiment, the first dielectric layer 211, the second dielectric layer 212, and the third dielectric layer 213 are press-fitted by using a thermo compression process.

In addition to the first dielectric layer 211, the second dielectric layer 212, and the third dielectric layer 213, the circuit board may further include another dielectric layer. This is not specifically limited herein.

To implement electrical connection between the second end 2242 of the feed probe 224 and the signal reference ground 221, in some embodiments, as shown in FIG. 7, the at least one feed probe 224 is a metal layer disposed on a surface that is of the first dielectric layer 211 and that faces the second dielectric layer 212, and a metallized via hole 225 is provided at a location of the first dielectric plate layer 211 corresponding to the second end 2242 of each feed probe 224. The metallized via hole 225 penetrates the first dielectric layer 211. The second end 2242 of the feed probe 224 is electrically connected to the signal reference ground 221 through the metallized via hole 225. Providing the metallized via hole 225 on the dielectric layer has relatively high precision, low costs, and is easy to implement.

To obtain a relatively large antenna bandwidth, in some embodiments, as shown in FIG. 5, a length d of the part that is of each feed probe 224 and that is face-to-face with the first radiation patch 222 is 0.4 to 0.6 times a wavelength. When the length of the part that is of the feed probe 224 and that is face-to-face with the first radiation patch 222 falls within this range, the antenna structure 22 has a relatively large bandwidth and a relatively low profile.

The part that is of the feed probe 224 and that is face-to-face with the first radiation patch 222 is a part that is of the feed probe 224 and that is used to feed the first radiation patch 222. A part that is of the feed probe 224 and that is face-to-face with the second radiation patch 223 is a part that is of the feed probe 224 and that is used to feed the second radiation patch 223. To ensure that a length of the part that is of the feed probe 224 and that is used to feed the first radiation patch 222 is approximately equal to a length of the part that is of the feed probe 224 and that is used to feed the second radiation patch 223, in some embodiments, as shown in FIG. 5 and FIG. 6, a projection area of the first radiation patch 222 on the plane on which the signal reference ground 221 is located is the first projection area A, and a projection area of the second radiation patch 223 on the plane on which the signal reference ground 221 is located is the second projection area B. The center O of the first projection area A coincides with the center O of the second projection area B. As a result, a distance between an edge of the first projection area A and an edge of the second projection area B is relatively short, and the length of the part that is of the feed probe 224 and that is used to feed the first radiation patch 222 is approximately equal to the length of the part that is of the feed probe 224 and that is used to feed the second radiation patch 223.

To increase transmitting and receiving capacities of the antenna structure 22, in some embodiments, as shown in FIG. 5 and FIG. 6, the at least one feed probe 224 includes two feed probes 224. A projection area, on the plane on which the signal reference ground 221 is located, of a part **224*a* that is of one of the two feed probes 224 and that is face-to-face with the first radiation patch 222 is a third projection area C1. The third projection area C1 is perpendicular to a first axis $l_1$ that passes through the center O of the first projection area A and that is on the plane on which the signal reference ground 221 is located, and the third projection area C1 is axially symmetrical with respect to the first axis $l_1$. A projection area, on the plane on which the signal reference ground 221 is located, of a part 224*a* that is of the other one of the two feed probes 224 and that is face-to-face with the first radiation patch 222 is a fourth projection area C2. The fourth projection area C2 is perpendicular to a second axis 12 that passes through the center O of the first projection area A and that is on the plane on which the signal reference ground 221 is located, and the fourth projection area C2 is axially symmetrical with respect to the second axis $l_2$. The first axis $l_1$ is perpendicular to the second axis $l_2$. In this way, dual polarization of the antenna structure 22 may be implemented by using the two feed probes 224, so that the antenna structure 22 can simultaneously transmit or receive two signals, thereby increasing transmitting and receiving capacities of the antenna structure 22**, ensuring relatively high isolation between two polarization directions, and avoiding cross interference.

Optionally, both the first radiation patch 222 and the second radiation patch 223 are in the shape of a square. In this way, when the antenna structures 22 form an array, cross interference between two adjacent antenna structures 22 is relatively weak.

Figure 8:
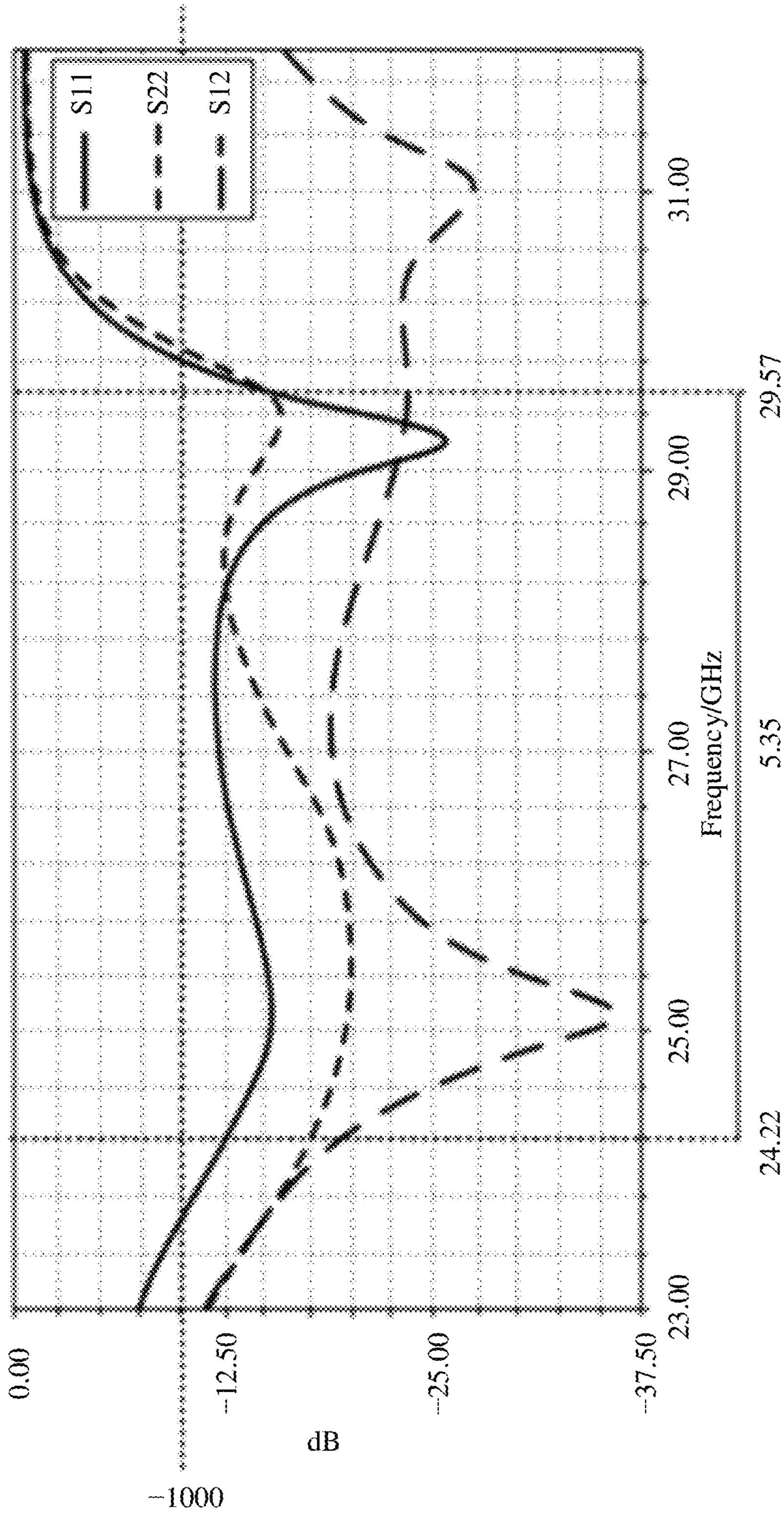
FIG. 8 shows an input return loss curve when a port 1 is excited, an input return loss curve when a port 2 is excited, and an isolation curve between the port 1 and the port 2 for the antenna structure shown in FIG. 5.
Figure 9:
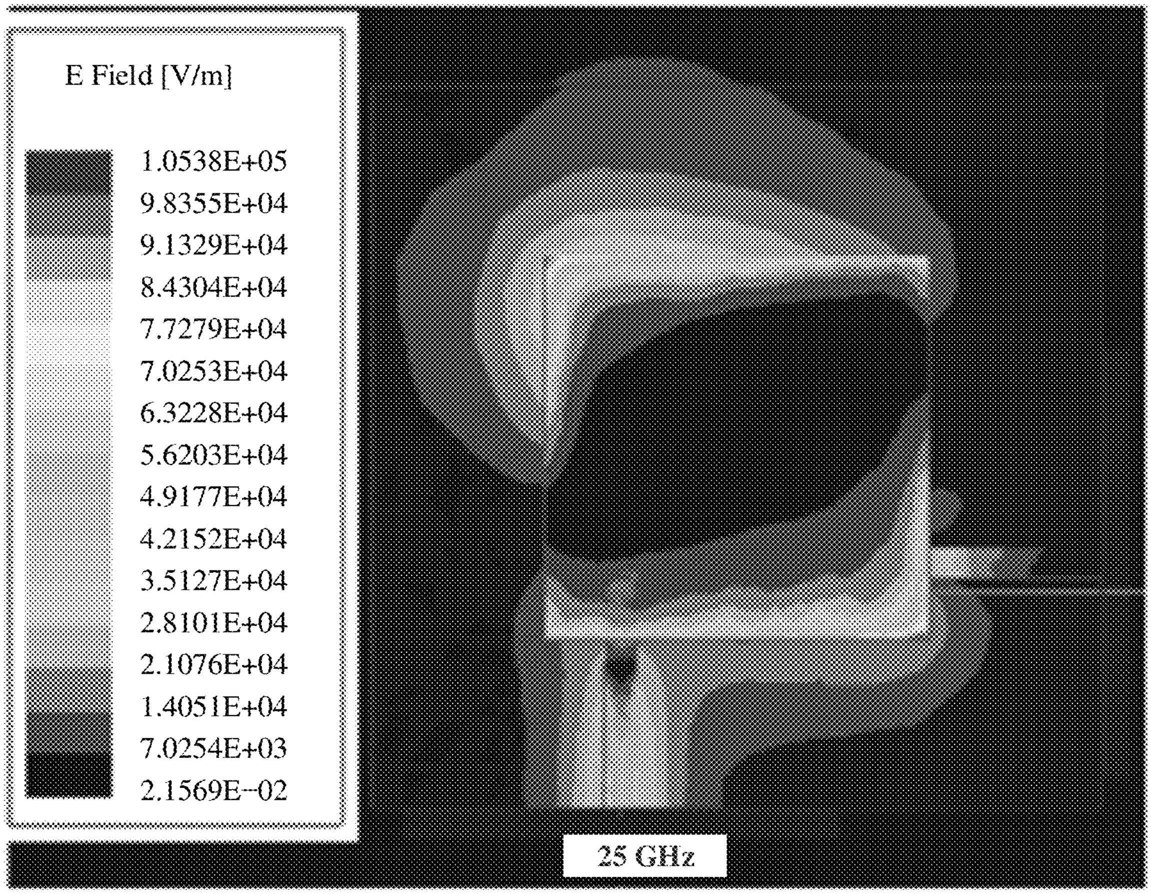
FIG. 9 is a diagram of electric field distribution on a second radiation patch in the antenna structure shown in FIG. 5 when an excitation frequency of a port 1 is 25 GHz.
Figure 10:
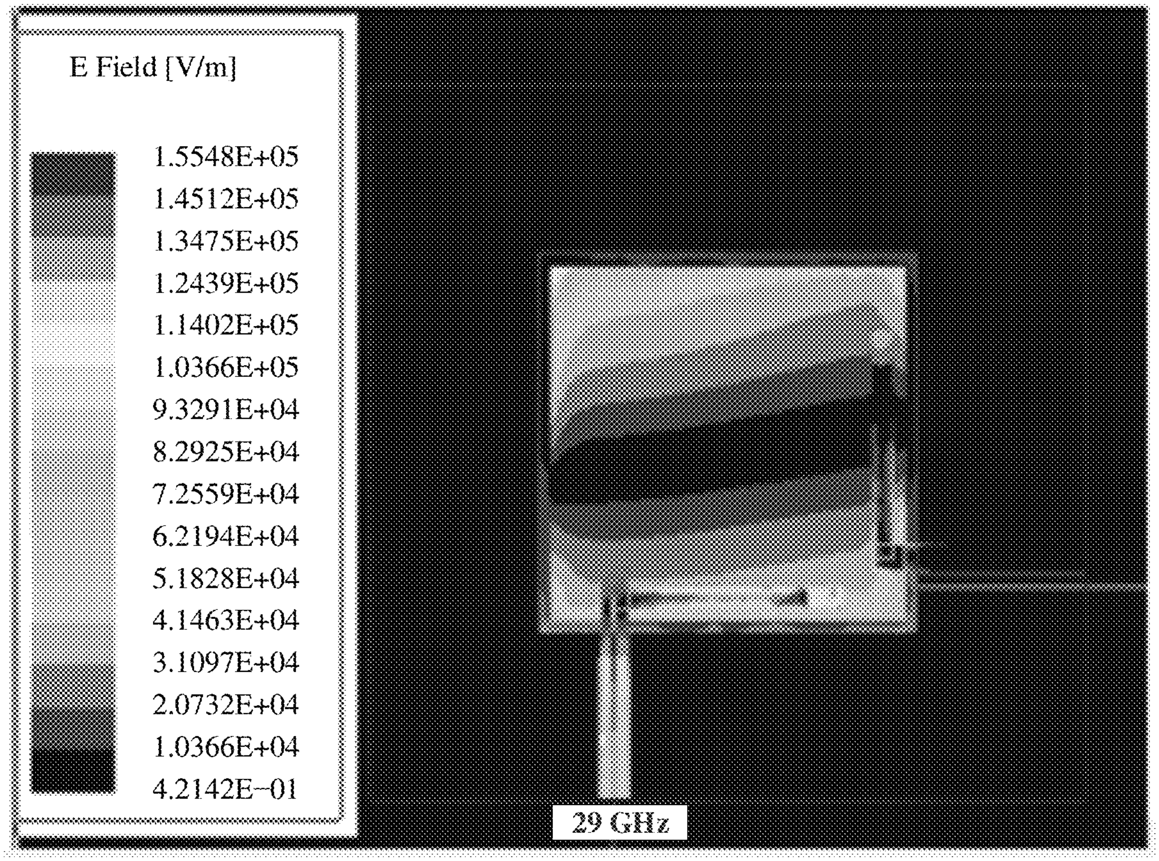
FIG. 10 is a diagram of electric field distribution on a first radiation patch in the antenna structure shown in FIG. 5 when an excitation frequency of a port 1 is 29 GHz.

To verify practicability of the dual-polarized antenna structure shown in FIG. 4 and FIG. 5, the following operations are performed: Only a port 1 (namely, a first end of one feed probe 224) in FIG. 5 is excited; for an obtained input return loss curve, refer to S11 in FIG. 8; for electric field distribution on the first radiation patch 222 at a frequency of 29 GHz, refer to FIG. 10; for electric field distribution on the second radiation patch 223 at a frequency of 25 GHz, refer to FIG. 9. Only a port 2 (namely, a first end of the other feed probe 224) in FIG. 5 is excited; for an obtained input return loss curve, refer to S22 in FIG. 8; for obtained isolation between the port 1 and the port 2, refer to S12 in FIG. 8. It can be learned from FIG. 8, FIG. 9, and FIG. 10 that, when feeding is performed through any one of the feed probes 224, the two radiation patches (that is, the first radiation patch 222 and the second radiation patch 223) can both generate two resonances. In addition, when a return relative bandwidth is 25%, isolation between the port 1 and the port 2 is below—15 dB. In other words, the bandwidth is relatively large and the isolation is relatively good. Therefore, the dual-polarized antenna structure can be used.

Figure 11:
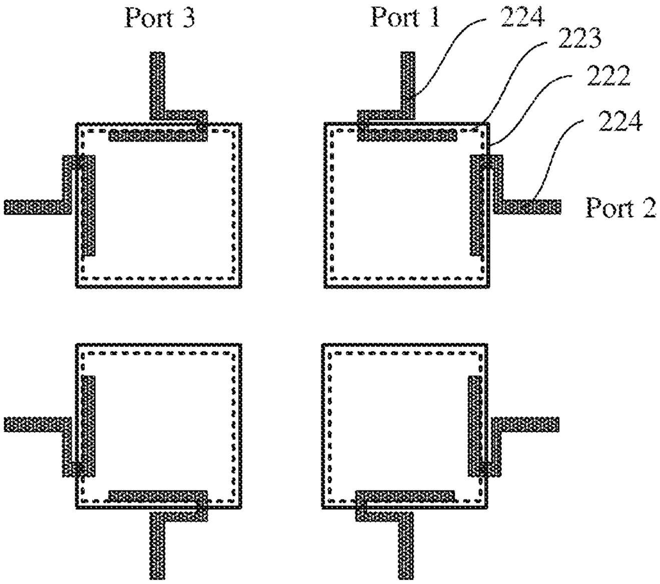
FIG. 11 is a schematic diagram of a structure of an antenna structure array on a third type of a circuit board with an antenna structure according to an embodiment of this application.

To obtain a relatively large antenna gain, in some embodiments, as shown in FIG. 11, at least one antenna structure 22 on a circuit board includes a plurality of antenna structures 22, and an array of the plurality of antenna structures 22 is disposed on the circuit board. In this way, a relatively large antenna gain can be obtained by using the array of the antenna structures 22.

Figure 12:
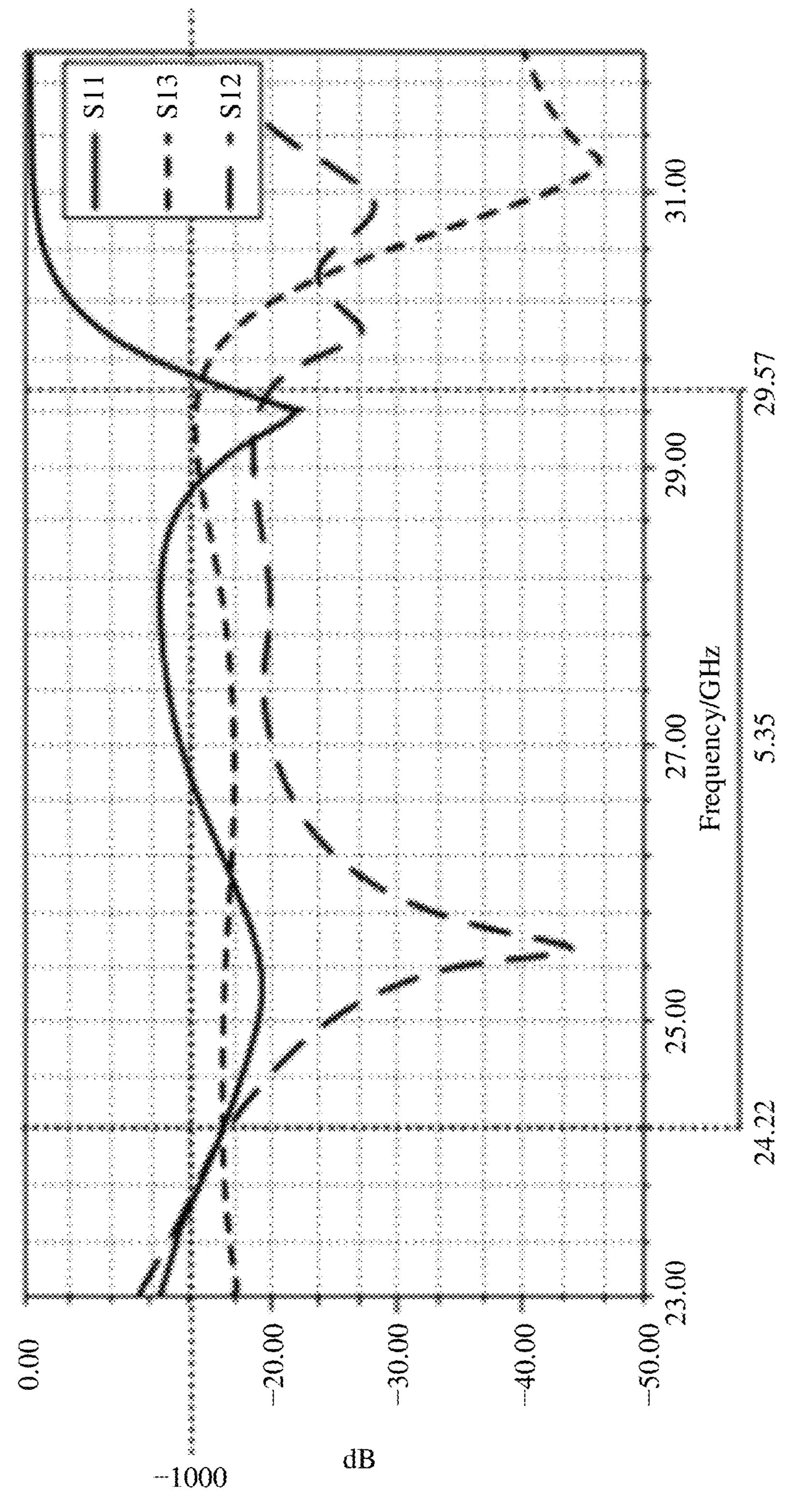
FIG. 12 shows an input return loss curve when a port 1 is excited, an isolation curve between the port 1 and a port 2, and an isolation curve between the port 1 and a port 3 for the antenna structure array on a circuit board with an antenna structure shown in FIG. 11.

To verify practicability of the antenna structure array shown in FIG. 11 in which a distance between two adjacent antenna structures 22 is shown as 5 mm, the following operations are performed: Only a port 1 in FIG. 11 is excited; for an obtained input return loss curve, refer to S11 in FIG. 12; for obtained isolation between the port 1 and a port 2, refer to S12 in FIG. 12; for obtained isolation between the port 1 and a port 3, refer to S13 in FIG. 12. It can be learned from FIG. 12 that, in an array including the antenna structures 22, a return relative bandwidth greater than 25% i, isolation of adjacent co-polarized ports (that is, S13) is below—15 dB; isolation of heteropolar ports (that is, S12) is below—15 dB. In other words, the bandwidth is relatively large and the isolation is relatively good. Therefore, the array including the antenna structures can be used.

In the descriptions of this specification, the specific features, structures, materials, or characteristics may be combined in an appropriate manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An antenna structure, comprising:

a signal reference ground;

a first radiation patch, wherein the first radiation patch and the signal reference ground are stacked and spaced apart from each other;

a second radiation patch, wherein the second radiation patch is located on a side of the first radiation patch that faces away from the signal reference ground, and the second radiation patch and the first radiation patch are stacked and spaced apart from each other; and at least one feed probe, wherein the at least one feed probe is located between the first radiation patch and the signal reference ground, and each feed probe of the at least one feed probe comprises a first end and a second end that are opposite to each other on the respective feed probe; and wherein for each feed probe of the at least one feed probe, the first end of the respective feed probe is a signal input end, and a projection position of the first end of the respective feed probe on a plane on which the signal reference ground is located is outside a projection area of the first radiation patch on the plane on which the signal reference ground is located;

wherein a projection position of the second end on the plane on which the signal reference ground is located is inside the projection area of the first radiation patch on the plane on which the signal reference ground is located; and wherein for each feed probe of the at least one feed probe, the second end of the respective feed probe is electrically connected to the signal reference ground; and wherein a part that is of each feed probe of the at least one feed probe and that is face-to-face with the first radiation patch is configured to feed the first radiation patch and the second radiation patch in a coupled feeding manner.

2. The antenna structure according to claim 1, wherein a length of the part that is of each feed probe and that is face-to-face with the first radiation patch is 0.4 to 0.6 times a wavelength of the antenna structure.

3. The antenna structure according to claim 1, wherein:

a projection area of the first radiation patch on the plane on which the signal reference ground is located is a first projection area;

a projection area of the second radiation patch on the plane on which the signal reference ground is located is a second projection area; and a center of the first projection area coincides with a center of the second projection area.

4. The antenna structure according to claim 3, wherein:

the at least one feed probe comprises two feed probes;

a projection area, on the plane on which the signal reference ground is located, of a part that is of a first feed probe of the two feed probes and that is face-to-face with the first radiation patch is a third projection area, the third projection area is perpendicular to a first axis that passes through the center of the first projection area and that is on the plane on which the signal reference ground is located, and the third projection area is axially symmetrical with respect to the first axis;

a projection area, on the plane on which the signal reference ground is located, of a part that is of a second feed probe of the two feed probes and that is face-to-face with the first radiation patch is a fourth projection area, the fourth projection area is perpendicular to a second axis that passes through the center of the first projection area and that is on the plane on which the signal reference ground is located, and the fourth projection area is axially symmetrical with respect to the second axis; and the first axis is perpendicular to the second axis.

5. The antenna structure according to claim 1, wherein both the first radiation patch and the second radiation patch are in the shape of a square.

6. A circuit board, comprising:

an antenna structure, wherein the antenna structure comprises:

a signal reference ground;

a first radiation patch, wherein the first radiation patch and the signal reference ground are stacked and spaced apart from each other;

a second radiation patch, wherein the second radiation patch is located on a side that of the first radiation patch that faces away from the signal reference ground, and the second radiation patch and the first radiation patch are stacked and spaced apart from each other; and at least one feed probe, wherein the at least one feed probe is located between the first radiation patch and the signal reference ground, and each feed probe of the at least one feed probe comprises a first end and a second end that are opposite to each other on the respective feed probe;

wherein for each feed probe of the at least one feed probe, the first end of each respective feed probe is a signal input end, and a projection position of the respective first end on a plane on which the signal reference ground is located is outside a projection area of the first radiation patch on the plane on which the signal reference ground is located;

wherein a projection position of the second end on the plane on which the signal reference ground is located is inside the projection area of the first radiation patch on the plane on which the signal reference ground is located;

wherein for each feed probe of the at least one feed probe, the respective second end is electrically connected to the signal reference ground; and wherein a part that is of each feed probe and that is face-to-face with the first radiation patch is configured to feed the first radiation patch and the second radiation patch in a coupled feeding manner.

7. The circuit board according to claim 6, wherein a length of the part that is of each feed probe and that is face-to-face with the first radiation patch is 0.4 to 0.6 times a wavelength of the antenna structure.

8. The circuit board according to claim 6, wherein:

the circuit board comprises a first dielectric layer, a second dielectric layer, and a third dielectric layer that are sequentially stacked;

the signal reference ground of the antenna structure is a metal layer disposed on a surface of the first dielectric layer that faces away from the second dielectric layer;

the at least one feed probe is a metal layer disposed on a surface of the first dielectric layer that faces the second dielectric layer, or the at least one feed probe is a metal layer disposed on a surface of the second dielectric layer that faces the first dielectric layer;

the first radiation patch is a metal layer disposed on a surface of the second dielectric layer that is faces away from the first dielectric layer; and the second radiation patch is a metal layer disposed on a surface of the third dielectric layer that is faces away from the second dielectric layer.

9. The circuit board according to claim 8, wherein the at least one feed probe is the metal layer disposed on the surface of the first dielectric layer that faces the second dielectric layer, a metallized via hole is disposed at a location of the first dielectric layer corresponding to a second end of each feed probe, the metallized via hole penetrates into the first dielectric layer, and the second end of the each feed probe is electrically connected to the signal reference ground through the metallized via hole.

10. The circuit board according to claim 6, wherein the circuit board comprises a plurality of antenna structures disposed in an array.

11. A communications device, comprising:

a housing; and an antenna structure disposed in the housing, wherein the antenna structure comprises:

a signal reference ground;

a first radiation patch, wherein the first radiation patch and the signal reference ground are stacked and spaced apart from each other;

a second radiation patch, wherein the second radiation patch is located on a side of the first radiation patch that faces away from the signal reference ground, and the second radiation patch and the first radiation patch are stacked and spaced apart from each other; and at least one feed probe, wherein the at least one feed probe is located between the first radiation patch and the signal reference ground, and each feed probe of the at least one feed probe comprises a first end and a second end that are opposite to each other on the respective feed probe;

wherein for each feed probe of the at least one feed probe, the respective first end is a signal input end, and a projection position of the respective first end on a plane on which the signal reference ground is located is outside a projection area of the first radiation patch on the plane on which the signal reference ground is located;

wherein a projection position of the second end on the plane on which the signal reference ground is located is inside the projection area of the first radiation patch on the plane on which the signal reference ground is located;

wherein for each feed probe of the at least one feed probe, the respective second end is electrically connected to the signal reference ground; and wherein a part that is of each feed probe and that is face-to-face with the first radiation patch is configured to feed the first radiation patch and the second radiation patch in a coupled feeding manner.

12. The communications device according to claim 11, wherein a length of the part that is of each feed probe and that is face-to-face with the first radiation patch is 0.4 to 0.6 times a wavelength of the antenna structure.

13. The communications device according to claim 11, wherein:

a projection area of the first radiation patch on the plane on which the signal reference ground is located is a first projection area;

a projection area of the second radiation patch on the plane on which the signal reference ground is located is a second projection area; and a center of the first projection area coincides with a center of the second projection area.

14. The communications device according to claim 13, wherein:

the at least one feed probe comprises two feed probes;

a projection area, on the plane on which the signal reference ground is located, of a part that is of a first feed probe of the two feed probes and that is face-to-face with the first radiation patch is a third projection area, the third projection area is perpendicular to a first axis that passes through the center of the first projection area and that is on the plane on which the signal reference ground is located, and the third projection area is axially symmetrical with respect to the first axis;

a projection area, on the plane on which the signal reference ground is located, of a part that is of a second feed probe of the two feed probes and that is face-to-face with the first radiation patch is a fourth projection area, the fourth projection area is perpendicular to a second axis that passes through the center of the first projection area and that is on the plane on which the signal reference ground is located, and the fourth projection area is axially symmetrical with respect to the second axis; and the first axis is perpendicular to the second axis.

15. The communications device according to claim 11, wherein both the first radiation patch and the second radiation patch are in the shape of a square.

16. The communications device according to claim 11, further comprising a circuit board, wherein the antenna structure is comprised in the circuit board.

17. The communications device according to claim 16, wherein:

the circuit board comprises a first dielectric layer, a second dielectric layer, and a third dielectric layer that are sequentially stacked;

a signal reference ground is a metal layer disposed on a surface of the first dielectric layer that faces away from the second dielectric layer;

the at least one feed probe is a metal layer disposed on a surface of the first dielectric layer that faces the second dielectric layer, or the at least one feed probe is a metal layer disposed on a surface of the second dielectric layer that faces the first dielectric layer;

the first radiation patch is a metal layer disposed on a surface of the second dielectric layer that faces away from the first dielectric layer; and the second radiation patch is a metal layer disposed on a surface of the third dielectric layer that faces away from the second dielectric layer.

18. The communications device according to claim 17, wherein the at least one feed probe is the metal layer disposed on the surface of the first dielectric layer that faces the second dielectric layer, a metallized via hole is disposed at a location of the first dielectric layer corresponding to a second end of each feed probe, the metallized via hole penetrates into the first dielectric layer, and the second end of the each feed probe is electrically connected to the signal reference ground through the metallized via hole.

19. The communications device according to claim 16, wherein the communications device comprises a plurality of antenna structures disposed in an array on the circuit board.

20. The communications device according to claim 11, wherein the communications device is a terminal.

* * * * *